2,977,388

PREPARATION OF ALKYLATED PENTABORANES

Joseph A. Neff, Niagara Falls, and Edward J. Wandel, Buffalo, N.Y., assignors, by mesne assignments, to Olin Mathieson Chemical Corporation, a corporation of Virginia No Drawing. Filed Oct. 19, 1955, Ser. No. 541,516

10 Claims. (Cl. 260—606.5)

Our invention relates to a method for the preparation of liquid alkylated pentaboranes, particularly alkylated pentaboranes containing from 2 to 5 carbon atoms in each alkyl radical such as monoethylpentaborane, monopropylpentaborane and the like.

Pentaborane may be prepared by methods which are described in the art; it is a colorless liquid which melts at $-46.8°$ C. The boron hydrides, and pentaborane in particular, because of their high heats of combustion, have been recognized as materials which are potentially of value as high energy fuels. The burning of these materials with oxygen liberates considerably more energy than the oxidation of a corresponding amount of hydrocarbon, producing very high flame temperatures. Pentaborane suffers from several disadvantages: (1) it has a very disagreeable odor; (2) it has a relatively high vapor pressure; its vapor pressure being 66 mm. of mercury at $0°$ C. and its boiling point at atmospheric pressure being $58°$ C.; and (3) its vapors are highly toxic.

One of the objects of this invention is to provide a method for producing high energy liquid products less volatile than pentaborane but at the same time approaching pentaborane in heat of combustion. In accordance with the present invention it has been discovered that pentaborane, hydrogen chloride, and olefins containing from 2 to 5 carbon atoms can be reacted in the presence of an alkylation catalyst, such as aluminum bromide, aluminum chloride or gallium trichloride, to form monoalkylated pentaboranes which are stable, relatively nonvolatile liquids with convenient handling characteristics. By this process olefins which are available at relatively low cost in large tonnages are reacted with pentaborane. The preparation and manner of using liquid alkylated pentaboranes, including monoethylpentaborane and monopropylpentaborane, is described in Altwicker, Garrett, Weilmuenster and Harris application Serial No. 497,408, filed March 28, 1955.

The following examples illustrate in detail various embodiments which fall within the scope of our invention. In the examples, the term "moles" means gram moles unless otherwise specified.

Example I

The reaction was carried out in a 25 cc. round-bottom flask which was equipped with a sparger tube for the introduction of the olefin and gaseous hydrogen chloride. The glass sparger tube entered the reaction flask at an angle of approximately $45°$ and extended from the widest diameter of the flask to a position very close to the bottom of the flask. Opposite the sparger tube a thermowell was provided for a thermometer. A 10 inch, 16 millimeter outside diameter column was attached to the reaction flask by means of a tapered glass joint. A distilling head was located at the top of the column. Through an opening in the distilling head a cold finger of slightly smaller diameter than that of the opening was introduced. During the reaction noncondensible gases were allowed to escape around the cold finger; pentaborane, olefin, and products which were condensed at the cold finger were returned to the reaction flask. No product was collected from the distilling head during the reaction; the distilling head served only as a convenient method of attaching the cold finger to the column top. During the reaction, the flask, with column and distilling head attached, was placed in a stainless steel beaker and surrounded with copper chips. The proper reaction temperature was maintained by the circulating of hot oil through a copper tube which was installed inside the stainless steel beaker. Gases introduced into the reactor (olefin and hydrogen chloride) were measured in individual rotameters, mixed together, and passed through a common line into the sparger.

The entire reaction and distillation of the crude reaction mixture was completed in a dry box with a nitrogen atmosphere. The loading of the reaction flask with the reactants, the measuring of the gaseous olefin and hydrogen chloride, and distillation of the crude products were all carried out inside this dry box.

In this experiment, a water-white liquid, pentaborane, in the amount of 11.5 g. was weighed out into the 25 cc. reaction flask inside the dry box. A quantity of boiling chips were then added to the flask. Next, 0.5 g. of powdered C.P. aluminum chloride was added to the flask. The aluminum chloride did not appear to dissolve completely in the pentaborane. The reactor was placed in the stainless steel beaker over the heater coil and copper chips were piled around it. The column and distilling head were then connected. Glass wool was wrapped around the column and around the distilling head up to the cold finger. Next, the rotameters were connected to a T which, in turn, was connected by a single line to the sparger tube. Hot oil was then circulated through the heating coil and the reaction flask and contents heated at $62°$ C. At the start of the heating period coolant was also circulated through the cold finger (methanol at $-78°$ C.) to prevent escape of reactants. Hydrogen chloride (112 cc. per minute at S.T.P.) and propylene (135 cc. per minute at S.T.P.) were metered through individual rotameters, mixed together, and passed through a single line into the sparger tube. The reaction took place over a period of 54 minutes. During the reaction, unreacted propylene and pentaborane condensed out on the colder parts of the column and on the cold finger and ran back into the flask. The pot temperature varied from $62°$ C. at the start of the experiment to a maximum of $70°$ C. at the termination of the experiment. The head temperature varied from $57°$ to $32°$ C. At the end of the 54 minute reaction period, the hydrogen chloride was shut off, the propylene flow was reduced to a trace, and the hot oil circulating through the heating coil was shut off. Next, the gas inlet tube (rubber tube) was disconnected and the opening sealed with a pinch clamp. The flask, after being disconnected from the column, was sealed and allowed to cool to room temperature. During the reaction 20.5 g. of crude yellow liquid product was formed which analyzed 45.10 and 44.56 percent boron by weight.

In the next operation a 19.0 g. aliquot of the crude material was distilled in the dry box. This aliquot was transferred to a 50 ml. flask equipped with a thermowell which was put in a stainless steel beaker and the space between the beaker wall and the flask packed with copper chips. The distilling column was attached to the flask and a distilling head, having a closed cold finger, was connected to the column. A receiver of approximately 5 cc. capacity was an integral part of this distilling head. The distilling head was also connected through a monometer to two cold traps in series, both held at $-78°$ C. and the traps, in turn, were connected to a vacuum pump. During the distillation process the vacuum pump was started and at 150 mm. of mercury and 24° C. the contents of the flask started to boil; the temperature of the flask continued to drop as the boiling continued (no heat being applied). At 20° C. the pressure was 80 mm. Pumping down continued and at 17° C. (pressure 52 mm.) heating of the flask was commenced by circulating hot oil through the heating coil and this heating was continued until the pot temperature reached 70° C. (pressure 20 mm.). When the pot temperature reached 30° C. coolant was started through the cold finger. The more volatile materials did not collect in the distilling head receiver which was maintained at room temperature but passed over into the first trap. At the conclusion of the distillation only a few drops of product were in the receiver. However, 5.7 g. of product was caught in the first trap. There was nothing in the second trap. The residue remaining in the distillation flask changed from a light yellow to a deep orange during the distillation operation and became slightly viscous. Approximately 7.4 g. was distilled over during this operation. The product from the first trap (5.7 g.) was analyzed for boron and found to contain 80.97 and 80.94 percent boron on two analyses. This was a water-white material with a viscosity not unlike water. Examination of this product by the mass spectrometer showed that it contained approximately 85 percent pentaborane and 15 percent monopropylpentaborane by weight. The residue, when analyzed, was found to contain 28.43 and 29.08 percent boron, based on two analyses. Additional analysis performed on the residue showed that it contained 53.40 percent carbon and 13.65 percent hydrogen. The corrected yield of monopropylpentaborane was 8 percent based on the pentaborane used. Analysis of the residue shows that this material may be mainly nonylpentaborane.

*Example II*

The apparatus used in this experiment was similar to that used in Example I. The reaction flask which had a capacity of 100 ml. was equipped with a thermowell and a sparger tube. A 10 inch, 16 millimeter outside diameter distilling column was attached to the flask glass joints. To the column was connected a distilling head with an open cold finger. As in the previous experiment, the hydrogen chloride and ethylene flows were individually measured by passage through separate rotameters, combined in a T, and passed into a reaction flask through a single inlet to the sparger.

Pentaborane, in the amount of 33 g., was weighed out into the 100 ml. round-bottom reaction flask inside the dry box. A supply of boiling chips was then added. Next, 1.2 g. of C.P. aluminum chloride in the form of chunks which did not appear to dissolve in the pentaborane was added to the flask The reaction flask was placed in a stainless steel beaker, as before, and surrounded with copper chips. Heating of the beaker and its contents was accomplished by the circulation of a hot stream of oil through a coil placed in the stainless steel beaker. Heating was started and the pot temperature was slowly raised to 60–62° C. Glass wool was placed over the copper chips, around the reaction flask, and also wrapped around the column. Hydrogen chloride, at the rate of 66 cc. per minute at S.T.P. and ethylene at the rate of 60 cc. per minute at S.T.P., were metered in through their individual rotameters, mixed together and passed into the reactor through the sparger tube. The reaction was continued for two hours and at the end of that time the contents of the flask weighed 34 g. At the conclusion of the reaction, the hydrogen chloride was shut off and the ethylene flow reduced to a trace amount. Next, the gas inlet hose was disconnected and a pinch clamp placed on the tube leading to the reaction flask. After the column had been removed from the flask, the flask was capped and allowed to cool to room temperature.

The crude reaction product was distilled at atmospheric pressure through the same column and distillation head. Four cuts were obtained which were as follows:

| Cut No. | Head Temperature, °C. | Weight, g. |
| --- | --- | --- |
| 1 | 61–64 | 8.3 |
| 2 | 64–91 | 2.5 |
| 3 | 91–103 | 10.9 |
| 4 | 103–120 | 1.4 |

At the conclusion of the distillation procedure a residue remained in the flask which was not weighed.

Analysis of cut 4 by means of the mass spectrometer revealed that the sample contained approximately 75 percent monoethylpentaborane by weight. Analysis of cut 3 by means of the mass spectrometer showed that it contained approximately 50 percent monoethylpentaborane by weight.

*Example III*

In this experiment, propylene and hydrogen chloride were bubbled for four hours through 1.2 moles of refluxing pentaborane-9 (60° C.) and 15 millimoles of aluminum chloride. During the reaction period 1.1 moles of propylene and 0.7 mole of hydrogen chloride were bubbled through the reaction mixture. The pot liquid was distilled and 42.7 g. of liquid, B.P. 62 to 103° C., was removed. The pot residue, 73.8 g., was further distilled and 23.3 g. of liquid, B.P. 118 to 121° C., was obtained which was identified as propylpentaborane-9 by infrared analysis The unweighed residue in the pot was brown viscous tar.

The infrared spectrum of the propylpentaborane-9 indicated no impurities. The 23.3 g. sample represents a yield, based on pentaborane charged, of approximately 20 percent.

*Example IV*

In this experiment, 0.5 mole of hydrogen chloride and 0.154 mole of propylene were bubbled through 0.180 mole of pentaborane-9 in admixture with 0.0022 mole of aluminum chloride at 56–65° C. during a period of 37 minutes. The liquid product was vacuum distilled at 12–48° C. under an absolute pressure of 200 to 16 millimeters of mercury, the lower pressure being at the higher temperature. The material distilled over was passed to a receiver maintained at room temperature. Noncondensibles from this receiver were routed through two traps in series held at −78° C.

By analysis the material retained in the receiver which weighed 4.9 g. was shown to contain 80.8 percent by weight boron, 14 percent by weight of monopropylpentaborane and 86 percent by weight pentaborane. In the first trap, which was maintained at −78° C., there was retained 1.8 g. of material which contained 49.6 percent by weight of boron, 88 percent by weight of monopropylpentaborane, 12 percent by weight of hexylpentaborane and no pentaborane. No material was retained in the second trap which was also maintained at −78° C. The residue (5.6 g.) was shown by mass spectrographic analysis to be hexyl- and nonylpentaboranes. The yield of monopropylpentaborane based on the quantity of pentaborane used was 19 percent; the conversion of pentaborane was 64 percent.

The following procedures and chemicals were used in all the following examples unless otherwise stated in the example. Each reaction was performed under a nitrogen atmosphere in a stainless steel dry box.

*Example V*

In this experiment 11.1 g. of liquid pentaborane-9 were added to a 0.3 g. of freshly ground aluminum chloride (C.P. grade) in a 25 cc. distilling flask. The flask was equipped with a sintered glass gas disparger tube sealed inside the reaction flask and purposely designed to reach the bottom of the flask. A glass thermowell provided an inlet for measuring pot temperatures. The distilling flask was attached to a 10–12 in. long distilling column, 16 mm. outside diameter. This column was fitted at the other end with a take-off head containing a cold finger condenser to prevent loss of pentaborane (B.P. 58° C. at 760 mm. Hg). Hydrogen chloride, 0.52 mole at a rate of approximately 300 cc./min. (measured by previously calibrated Fisher Porter gas flow meters), and propylene, 0.146 mole at a rate of 84 cc./min., were fed into a common tube leading to the gas sparger tube in the reactor. The gases were fed into the sparger tube when the pot temperature was approximately reflux temperature, 56–60° C., of the pentaborane. As the reaction proceeded, the temperature rose to a maximum of 76° C. The total reaction time was 39 minutes.

During the reaction the unreacted gases were bled out of the reaction flask past the cold finger condenser. The reaction flask showed an increase of weight of 5.2 grams of liquid product, giving a total of 16.3 grams. A small sample of this liquid was removed for boron and mass spectrum analysis. B 55.5, 55.4 weight percent. Mass spectrum analysis indicated at this point that the material was principally pentaborane, propylpentaborane and dipropylpentaborane. The remaining liquid was then transferred to a small distilling flask (13.1 g. after transfer) and attached to the distilling column and head described previously. The head was then attached by rubber tubing to a series of two Dry Ice-acetone cooled traps and further by rubber tubing to a vacuum pump. A slow (3½ hour) vacuum transfer from the distilling flask to the cooled traps was conducted from a pressure of 150 mm. Hg at 24° C. when the material was first seen to boil to a pressure of 3 mm. Hg at 46° C. pot temperature. In the traps 9.5 g. of liquid were collected by this treatment. The residue remaining in the distilling flask unweighed but reported as a trace (less than 1 gram) was submitted for boron and mass spectral analysis. B 43.7, 44.2. Mass spectral analysis indicated that this residue was probably one-third propylpentaborane, some dipropylpentaborane and a trace of unidentified material.

The above 9.5 g. of volatile liquid product collected in Dry-Ice cooled traps was not analyzed until further treatment described below. This 9.5 g. liquid sample was submitted to a crude atmospheric distillation to strip off the pentaborane. The same equipment was used as for the vacuum transfer above. Cooling was provided for the cold finger by a circulating Dry-Ice cooled methanol. The pot was heated with Dow Corning 550 fluid which, like the methanol, was led into and out of the dry box in copper tubing.

A sample of 2.5 grams of distillate boiling at approximately 60° C. was stripped from the product; B 79.6, 79.4 vs. 85.6 for pure pentaborane. The residue, 7.0 g., from this distillate was analyzed for boron 49.4, 49.6 and by mass spectrum. Mass spectral data indicated that this sample was probably 80 percent monopropylpentaborane, approximately 10 percent pentaborane, the remainder being dipropyl pentaborane and traces of unknown. The 7.0 g. sample, analyzing 80 percent or 5.6 g. of monopropylpentaborane, would indicate a yield based upon theoretical due to the propylene available for reaction (0.146 mole versus 0.178 mole of pentaborane) of 36 percent.

*Example VI*

The apparatus was similar to Example V. In this experiment 0.36 mole of pentaborane and 0.0015 mole of aluminum chloride were treated with 0.31 mole of propylene (at the rate of approximately 66 cc./min.) and 0.36 mole of hydrogen chloride (at the rate of approximately 70 cc./min.), for a period of 1.91 hours. The pot temperature range was 58–73° C. during this time. At the termination of the reaction the liquid in the pot weighed 31.8 grams compared to the original pentaborane charge of 22.7 g. Samples of the reaction product at this time analyzed 60.6 and 60.5 percent boron and were identified as mixtures of pentaborane, propylpentaborane and dipropylpentaborane by mass spectral analysis.

An aliquot of 28.0 g. of this liquid was then transferred to a distilling flask. This was attached by rubber tubing to a series of two cold traps (−78 to −80° C.) and further by more tubing to a vacuum pump. A slow vacuum transfer (4 hours) of part of the volatile material was then performed. During this period the pressure ranged from 200 mm. Hg at 21° C. down to 3 mm. Hg at 46° C. A total of 23.6 g. of liquid was collected in the first trap. The residue in the distilling flask weighed 3.2 g. Boron 36.8, 36.4 percent. The 23.6 g. of liquid analyzed 59.7, 60.7 percent boron. This material was then placed in a distilling flask and 8.0 grams of pentaborane analyzing 85.4, 85.8 percent boron was distilled off. The residue, 14.7 g. (53.0, 53.0 percent boron), was distilled further, giving three samples to be called cut No. 1, cut No. 2 and residue. Cut No. 1 was 1.8 g. and distilled at 75° C., boron 79.5, 79.4, assumed to be mostly pentaborane from the boron analysis and boiling point. Cut No. 2, 7.2 g., was identified by infrared spectrum as propylpentaborane (boron 52.8, 52.4). Mass spectrum analysis indicated propylpentaborane contaminated with traces of pentaborane and dipropylpentaborane. The yield, based on 0.31 mole of propylene fed into the reaction, is 22 percent, considering only this fraction. The residue (4.8 g.; 47.8, 47.8 boron), was chiefly propylpentaborane contaminated with dipropylpentaborane.

*Example VII*

In this experiment 0.188 mole pentaborane was treated with 0.0015 mole aluminum chloride, followed by 0.20 mole propylene (49 cc./min.) and 0.24 mole hydrogen chloride (58 cc./min.). The reaction time was 94 minutes and the pot temperature ranged from 52° C. at the beginning of the reaction to a maximum of 67° C. near the end. The liquid weight increased 6.0 grams during the reaction to a total of 17.9 g. An aliquot of this sample, 17.0 g., was placed in a distilling flask, and part of the sample, 11.9 g., vacuum transferred to a cold trap (−78 to −80° C.) at a beginning pot temperature 27° C., 240 mm. Hg to a pot temperature of 38° C. and 10 mm. Hg. This liquid collected in the trap (11.9 g.; boron 62.8, 62.6 percent) would indicate from boron analysis alone (assuming only pentaborane and propylpentaborane as the major components) that 67 percent or 8.0 g. of this sample was propylpentaborane. This would represent a yield of 40 percent based on pentaborane charged to the reactor.

*Example VIII*

In this experiment 0.21 mole of propylene and 0.25 mole of hydrogen chloride were bubbled through 0.192 mole of pentaborane-9 in the presence of 1.5 millimoles of aluminum chloride. Hydrogen chloride was admitted into the reaction flask at the rate of 58 cc./min., propylene at the rate of 50 cc./min. The reaction commenced at this point and was permitted to continue for 94 minutes. During this period of time the reaction temperature increased from 25 to 52° C., and the weight of the reaction vessel gained 4.6 grams (from 12.1 to 16.7 g.). At the end of this time samples were taken of the reaction mixture for boron and mass spectrum analyses (see below). The reaction mixture was then vacuum transferred and both the transferred portion (9.3 g.) and the residual portion (4.5 g.) were each in turn further distilled. Fractions of each were submitted for boron and mass spectrum analysis.

Mass spectrometric analysis showed about a third of the reaction mixture to be propylpentaborane-9. This same mixture was found to consist approximately of 60 percent boron. 9.3 grams of this mixture that was vacuum transferred was found also to consist of about a third of its weight of propylpentaborane-9; this transferred material contained 64.9 percent boron. Analyses of the remaining residual fraction showed it contained a significant quantity (about ½ to ⅔) of propylpentaborane-9 and 42.2 percent boron.

Further distillation of 8.7 grams of the transferred material, into three fractions at atmospheric pressure, at a temperature ranging from approximately 60–120.5° C., and subsequent analysis showed that the first fraction (4.3 grams) contained a negligible quantity of propylpentaborane-9; the second fraction (2.1 grams) contained mainly (approximately 90 percent) propylpentaborane-9; and the third fraction (2.3 grams) also contained mainly propylpentaborane-9.

Further distillation of 2.6 grams of the residue, into three fractions under vacuum with its vapor pressure ranging from 75 mm. to less than 1 mm., and subsequent analyses showed that each of the three fractions contained negligible quantities of propylpentaborane-9.

Various modifications can be made in the procedures of the specific examples to provide other embodiments which fall within the scope of our invention. Thus, in place of the ethylene and propylene used, there can be substituted other monoolefins containing from 2 to 5 carbon atoms, for example, 1-butene, 2-butene, isobutylene, 1-pentene, 2-pentene, 2-methyl-2-butene, and the like. Also, in place of the aluminum bromide and aluminum chloride employed as a catalyst there can be substituted other alkylation catalysts, such as gallium trichloride or ferric chloride. The relative amounts of the various materials introduced into the reaction zone can be varied considerably, as can also the reaction temperature. In general, however, the quantity of hydrogen chloride used will vary from about 0.05 mole to 3.0 moles per mole of pentaborane, the preferred range being from 0.5 to 2.0 moles of hydrogen chloride per mole of pentaborane. Likewise, the quantity of aluminum chloride, aluminum bromide, or equivalent can be varied widely, generally from 0.001 mole (a catalytic amount) to 0.250 mole per mole of pentaborane, and preferably from 0.002 mole to 0.020 mole per mole of pentaborane. The amount of olefin used can be varied through a wide range of from about 0.5 to 6.0 moles per mole of pentaborane, the preferred range being from 1.0 to 2.5 moles per mole of pentaborane. The reaction temperature can be varied between about 0° and 100° C., the preferred range being between 20° and 70° C.

We claim:
1. A method for the preparation of liquid alkylated pentaboranes which comprises reacting pentaborane with a monoolefin hydrocarbon containing from 2 to 5 carbon atoms while they are in admixture with hydrogen chloride and an aluminum halide selected from the group consisting of aluminum bromide and aluminum chloride.
2. The method of claim 1 wherein said monoolefin is ethylene.
3. The method of claim 1 wherein said monoolefin is propylene.
4. The method of claim 1 wherein said aluminum halide is aluminum bromide.
5. The method of claim 1 wherein said aluminum halide is aluminum chloride.
6. A method for the preparation of liquid alkylated pentaboranes which comprises passing hydrogen chloride and a monoolefin hydrocarbon containing from 2 to 5 carbon atoms into a mixture of pentaborane and an aluminum halide selected from the group consisting of aluminum bromide and aluminum chloride at a temperature from about 0 to 100° C., the reaction being conducted using from 0.05 to 3.0 moles of hydrogen chloride per mole of pentaborane, from 0.001 to 0.250 mole of said aluminum halide per mole of pentaborane, and from 0.5 to 6.0 moles of said monoolefin per mole of pentaborane.
7. The method of claim 6 wherein said monoolefin is ethylene.
8. The method of claim 6 wherein said monoolefin is propylene.
9. The method of claim 6 wherein said aluminum halide is aluminum bromide.
10. The method of claim 6 wherein said aluminum halide is aluminum chloride.

References Cited in the file of this patent

Groggins: Unit Processes in Organic Synthesis, 4th ed. (1952). (Pages 800 and 846–853 relied on. Copy in Patent Office Library.)

Gilman: Organic Chemistry, 2nd ed. (1943), vol. I. (Pages 40–43 relied on. Copy in Div. 46.)